(12) United States Patent
Wu

(10) Patent No.: US 11,006,273 B2
(45) Date of Patent: May 11, 2021

(54) LOCATION/THINGS AWARE CLOUD SERVICES DELIVERY SOLUTION

(71) Applicant: Citrix Systems, Inc., Fort Lauderdale, FL (US)

(72) Inventor: Hao Wu, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 111 days.

(21) Appl. No.: 15/723,978

(22) Filed: Oct. 3, 2017

(65) Prior Publication Data

US 2019/0104409 A1 Apr. 4, 2019

(51) Int. Cl.
| | |
|---|---|
| *H04L 29/06* | (2006.01) |
| *H04W 12/06* | (2021.01) |
| *H04W 12/10* | (2021.01) |
| *H04W 64/00* | (2009.01) |
| *H04W 4/02* | (2018.01) |
| *G01S 19/13* | (2010.01) |
| *H04W 4/80* | (2018.01) |

(52) U.S. Cl.
CPC ......... *H04W 12/06* (2013.01); *H04L 63/0853* (2013.01); *H04L 63/107* (2013.01); *H04L 63/20* (2013.01); *H04W 4/02* (2013.01); *H04W 12/10* (2013.01); *H04W 64/00* (2013.01); *H04W 64/003* (2013.01); *G01S 19/13* (2013.01); *H04W 4/80* (2018.02)

(58) Field of Classification Search
CPC ... H04L 63/0853; H04L 63/107; H04L 63/20; H04W 12/08

USPC ........................................................... 726/7
See application file for complete search history.

(56) References Cited

U.S. PATENT DOCUMENTS

| | | | |
|---|---|---|---|
| 8,844,040 B2 * | 9/2014 | Harris ..................... | H04L 63/08 |
| | | | 713/151 |
| 9,491,588 B1 * | 11/2016 | Biehl ..................... | H04W 4/043 |
| 10,129,257 B2 * | 11/2018 | McGovern .............. | H04L 63/20 |
| 2003/0179073 A1 * | 9/2003 | Ghazarian ............... | E05B 47/00 |
| | | | 340/5.6 |
| 2011/0013637 A1 * | 1/2011 | Xue .................... | H04L 12/4679 |
| | | | 370/395.5 |
| 2014/0032284 A1 * | 1/2014 | Kohn ................. | G06Q 30/0231 |
| | | | 705/14.3 |
| 2015/0319242 A1 * | 11/2015 | Olster ................. | G06F 11/2094 |
| | | | 707/634 |

(Continued)

*Primary Examiner* — Longbit Chai
(74) *Attorney, Agent, or Firm* — Foley & Lardner LLP

(57) ABSTRACT

Described embodiments provide systems and methods for policy-based authentication, where the policy may designate locations and/or forms of proof of locations, for use in authentication. Some embodiments include or utilize a database storing authentication policies. In an example system, an authentication server in communication with the database is configured to receive a request from a device needing authentication. The request may include a credential. The authentication server is configured to retrieve, from the database storing authentication policies, an authentication policy corresponding to the device, the retrieved authentication policy specifying a location parameter. The authentication server is configured to receive location data from the device and resolve the authentication request using the credential and the received location data pursuant to the retrieved authentication policy.

20 Claims, 8 Drawing Sheets

(56) References Cited

U.S. PATENT DOCUMENTS

2018/0103351 A1\* 4/2018 Emmanuel ............ H04L 67/303

\* cited by examiner

LOCATION/THINGS AWARE CLOUD SERVICES DELIVERY SOLUTION

BACKGROUND

Network accessible computing systems, e.g., servers in a data center, provide various services over a network (e.g., the Internet). These systems are sometimes referred to as "cloud based" or "in the cloud" in reference to their off-premises location within the network (which is often depicted in figures as a cloud). Cloud-based services may be hosted on servers owned or managed by a third-party, e.g., under a tenancy or co-tenancy arrangement. The third-party providing the hardware (or time on shared hardware) may be referred to as a cloud-services provider. Cloud-based services provide a variety of conveniences, including the ability to quickly provision new services, the ability to provide services and functionality to network-connected customers in a variety of contexts, and the ability to seamlessly migrate data between network-connected devices.

Computer systems are increasingly reliant on cloud-based services. This has allowed for simplification of devices, reducing size and cost. Special-purpose devices are being developed that rely heavily on network-based resources, and extend the network to support a variety of new functionality. The wide variety of network-reliant devices ("things") is sometimes referred to as "the Internet of Things," or "IoT."

The cloud provides significant flexibility, but also provides unique security concerns. Network-connected devices may be able to access cloud-based services from anywhere with a network connection. Malicious hackers may be able to exploit security flaws and vulnerabilities to elevate privileges, repurpose systems, steal data, deny service, and so forth. It is therefore important to the functionality of these devices to maintain adequate security measures.

Multi-factor authentication mechanisms can enhance security. A typical multi-factor authentication mechanism uses a credential plus a secondary information element such as a pin code or out-of-band challenge response. These mechanisms can be inefficient when they require users to manually input more information, and may be ineffective for authenticating IoT devices.

These and other technical problems are addressed by the subject matter described.

SUMMARY

This Summary is provided to introduce a selection of concepts in a simplified form that are further described below in the Detailed Description. This Summary is not intended to identify key features or essential features, nor is it intended to limit the scope of the claims included herewith.

Described embodiments provide systems and methods for policy-based authentication, where the policy may designate locations and/or forms of proof of locations, for use in authentication. Some embodiments include or utilize a database storing authentication policies. In an example system, an authentication server in communication with the database is configured to receive a request from a device needing authentication. The request may include a credential. The authentication server is configured to retrieve, from the database storing authentication policies, an authentication policy corresponding to the device, the retrieved authentication policy specifying a location parameter. The authentication server is configured to receive location data from the device and resolve the authentication request using the credential and the received location data pursuant to the retrieved authentication policy.

In at least one aspect, described is a method for authentication. The method includes receiving, by a server in a first network, an authentication request from a device in a second network, the authentication request including a first credential. The method includes retrieving, by the server, from a database storing authentication policies, an authentication policy corresponding to the device, the retrieved authentication policy specifying a location parameter. The method includes receiving, by the server, location data from the device. The method includes resolving the authentication request using the first credential and the received location data pursuant to the retrieved authentication policy.

In at least one aspect, described is a system for authentication. The system includes a database storing authentication policies. The system includes an authentication server in communication with the database, the authentication server situated in a first network. The authentication server includes at least one processor and is configured to receive an authentication request from a device in a second network, the authentication request including a first credential. The authentication server is configured to retrieve, from the database storing authentication policies, an authentication policy corresponding to the device, the retrieved authentication policy specifying a location parameter. The authentication server is configured to receive location data from the device and resolve the authentication request using the first credential and the received location data pursuant to the retrieved authentication policy.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

The subject matter described covers topics that, among other things, enables a request to be authenticated using a location-based multi-factor mechanism. Authentication is a determination that a request attributing its origin to a party actually originated with the attributed party. That is, that the request is authentic. This may be a condition precedent for determining whether the party has the requisite authority to complete the request. Authentication is particularly helpful in preventing malicious attacks that falsify (or "spoof") request origination. In some embodiments, the location-based factor is geographically dependent, e.g., requiring the request to provide evidence or proof that the request originated at a particular geographic location or within a geographic region. This is, in some respects, a form of "geo fence." In some embodiments, the location-based factor is proximity dependent, e.g., requiring the request to provide evidence or proof that the request originated at a device that is near to (or in proximity with) another particular device. In some embodiments, the location-based multi-factor mechanism uses a device-dependent policy, such that the mechanism is flexible within the capabilities of the device generating the request to be authenticated. In some embodiments, the authentication policy includes a hierarchy, e.g., requiring a device to provide satellite-based location data unless the device is inside (and unable to receive satellite signals) and falling back to a secondary form of location evidence such as being on a network associated with the correct location or having short-range proximity to a radio beacon associated with the correct location.

Figure 1A:
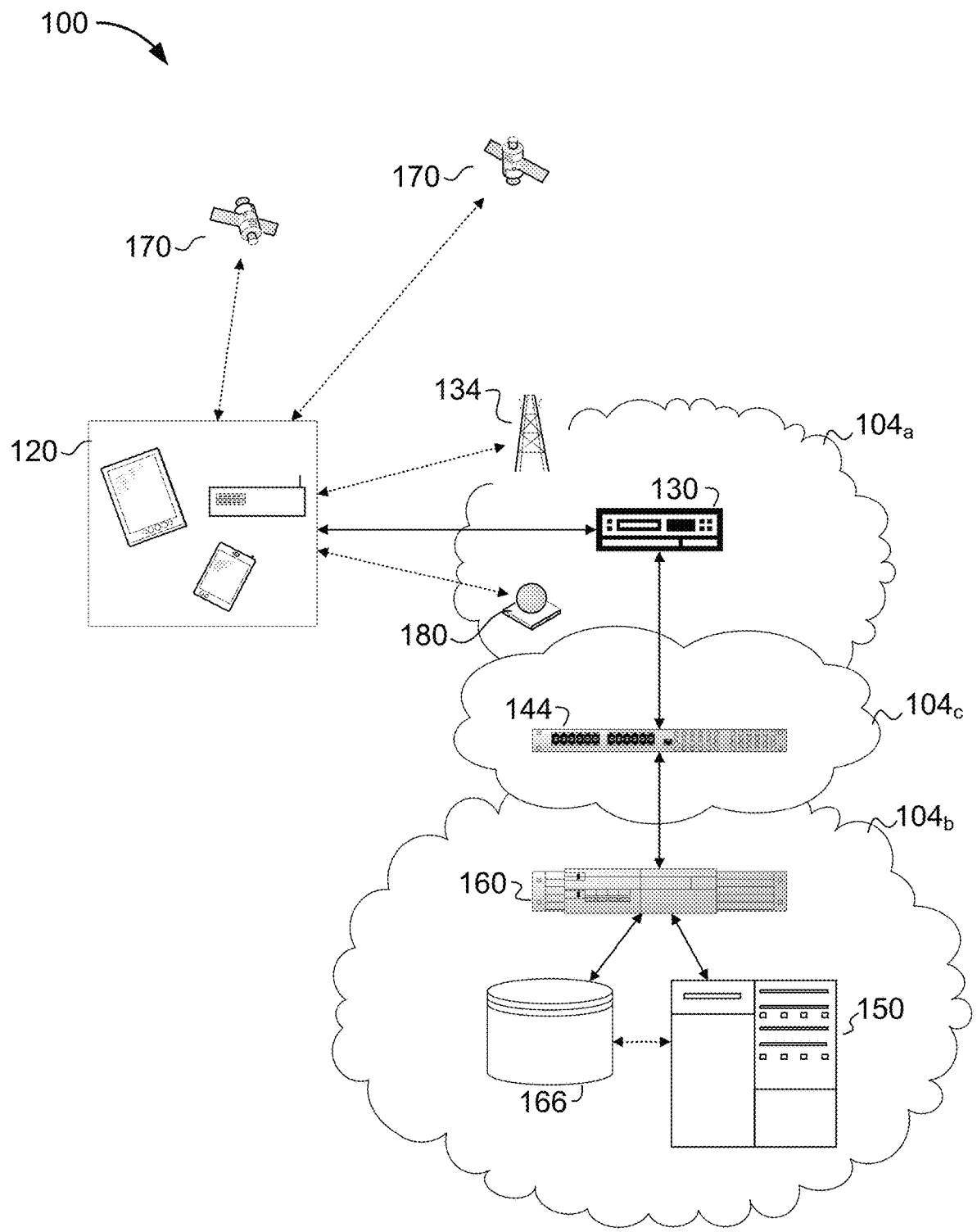
FIG. 1A is a block diagram of an illustrative network environment, in accordance with an illustrative embodiment.

FIG. 1A depicts an illustrative network environment 100, in accordance with an illustrative embodiment. The network environment 100 includes a provider network $104_a$, a production network $104_b$, and one or more other networks such as a transit network $104_c$ (the provider network $104_a$, the production network $104_b$, and the transit network $104_c$ are referred to generally as networks 104). Within the network environment 100, client devices 120 communicate with servers 150, and the servers 150 provide one or more network services to the client devices 120. As shown in FIG. 1A, servers 150 are situated in the production network $104_b$. The client devices 120 communicate with the servers 150 via the provider network $104_a$ which may pass data directly to the production network $104_b$ or pass data through one or more intermediary networks, e.g., through the transit network $104_c$. Network communications between the client devices 120 and the servers 150 flow through network devices 144 such as switches, routers, hubs, filters, firewalls, gateways, and so forth. For example, the provider network $104_a$ includes an access point 130 that directs traffic from client devices 120 to the servers 150. As shown in FIG. 1A, the production network $104_b$ includes an authentication server 160 responsible for authenticating requests to the one or more servers 150. Although shown as an independent server, in some implementations the functions or features of the authentication server 160 are incorporated into one or more servers 150 providing other additional services. The authentication server 160 authenticates incoming requests, e.g., requests from the clients 120, using data stored in a data storage devices 166. The stored data may include, for example, authentication policies requiring client devices 120 to be within or near specified locations as part of the authentication process. As shown in FIG. 1A, the authentication server 160 may enforce these policies based on location data from the client devices 120 such as, for example, location determined based on satellites 170 or a short-range radio beacon 180. In some embodiments, device location is determined based on a location of the access point 130 or a radio receiver 134 used for accessing the provider network $104_a$. The data storage 166 stores these authentication policies, e.g., using a local database system, flat file system, or other data organization scheme.

Suitable examples of client devices 120 include various processor-based devices that execute instructions for interactions with servers 150 via a network 104. Some example client devices 120 are "Internet of Things" ("IoT") devices. For example, some example client devices 120 are passive monitoring devices such as thermometers, hydrometers, barometers, smoke detectors, light sensors, and the like. Some example client devices 120 receive input from a user and/or present output to the user. For example, the client device 120 may be any kind of computing device, including, e.g., a desktop computer, a laptop or notepad computer, a thin client, a mobile device such as a tablet or electronic "pad," a smart phone or data phone, a "smart" watch or other wearable, a gaming system, an Internet Radio, or any other device capable of the functions described herein. The client devices 120 are capable of exchanging information with other computing devices via a network 104 (e.g., via the provider network $104_a$). For example, a client device 120 may exchange information over the network 104 using protocols in accordance with the Open Systems Interconnection ("OSI") layers, e.g., using an OSI layer-4 transport protocol such as the User Datagram Protocol ("UDP") or the Transmission Control Protocol ("TCP"), layered over an OSI layer-3 network protocol such as Internet Protocol ("IP"), e.g., IPv4 or IPv6. In some embodiments, the client device 120 supports network communication using Secure Socket Layer ("SSL") or Transport Layer Security ("TLS"), which encrypts communications layered over a reliable transport protocol (such as TCP). In some embodiments, the client device 120 is a thin-client, or functions as a thin-client, executing a thin-client protocol or remote-display protocol such as the Independent Computing Architecture ("ICA") protocol created by Citrix Systems, Inc. of Fort Lauderdale, Fla. The ICA protocol allows presentation at the client device 120 of software executing remotely (e.g., at a server 150), as though the remotely executed software were executed locally on the client device 120. In some embodiments, one or more of the servers 150 with which the client devices 120 communicate supports a custom instruction set, e.g., an application programming interface ("API"), and a custom application executed on the client device 120 implements the API. An application can implement an API using, for example, a library such as a dynamic link library ("DLL") or a software development kit ("SDK") provided to the application's developer.

In some embodiments, the client device 120 includes one or more hardware elements for receiving location signals from satellites 170 or other long-range transmitters. Examples of satellite-based location services (also known as global navigation satellite systems, "GNSS") include the U.S. Global Positioning System ("GPS"), the Russian Global Navigation Satellite System ("GLONASS"), and the European Union's Galileo system. A client device 120 equipped with a GNSS receiver may detect signals from multiple satellites 170 and use the signals to determine a location, e.g., a latitude and longitude coordinate pair, for the client device 120. Typically, GNSS requires line of sight to the satellites 170 and works best outside. These systems may be less reliable, or unreliable, in locations where visibility to the satellites 170 is obstructed, e.g., inside.

In some embodiments, the client device 120 includes one or more hardware elements for near-field or short-range radio communication. These elements may be used to communicate with other devices in close proximity (that is, within range for a given radio communication protocol). Examples of near-field or short-range radio communication protocols include BLUETOOTH, ANT+, radio frequency identification ("RFID"), and near field communication ("NFC"). In some instances, a client device 120 may exchange data with a special purpose near-field or short-range radio beacon 180. Examples of a suitable beacon 180 include, but are not limited to, an NFC tag or RFID tag, an RFID reader, APPLE iBEACON, GOOGLE EDDYSTONE, QUALCOMM GIMBAL, and PHILLIPS Visual Light Communications ("VLC").

Figure 1B:
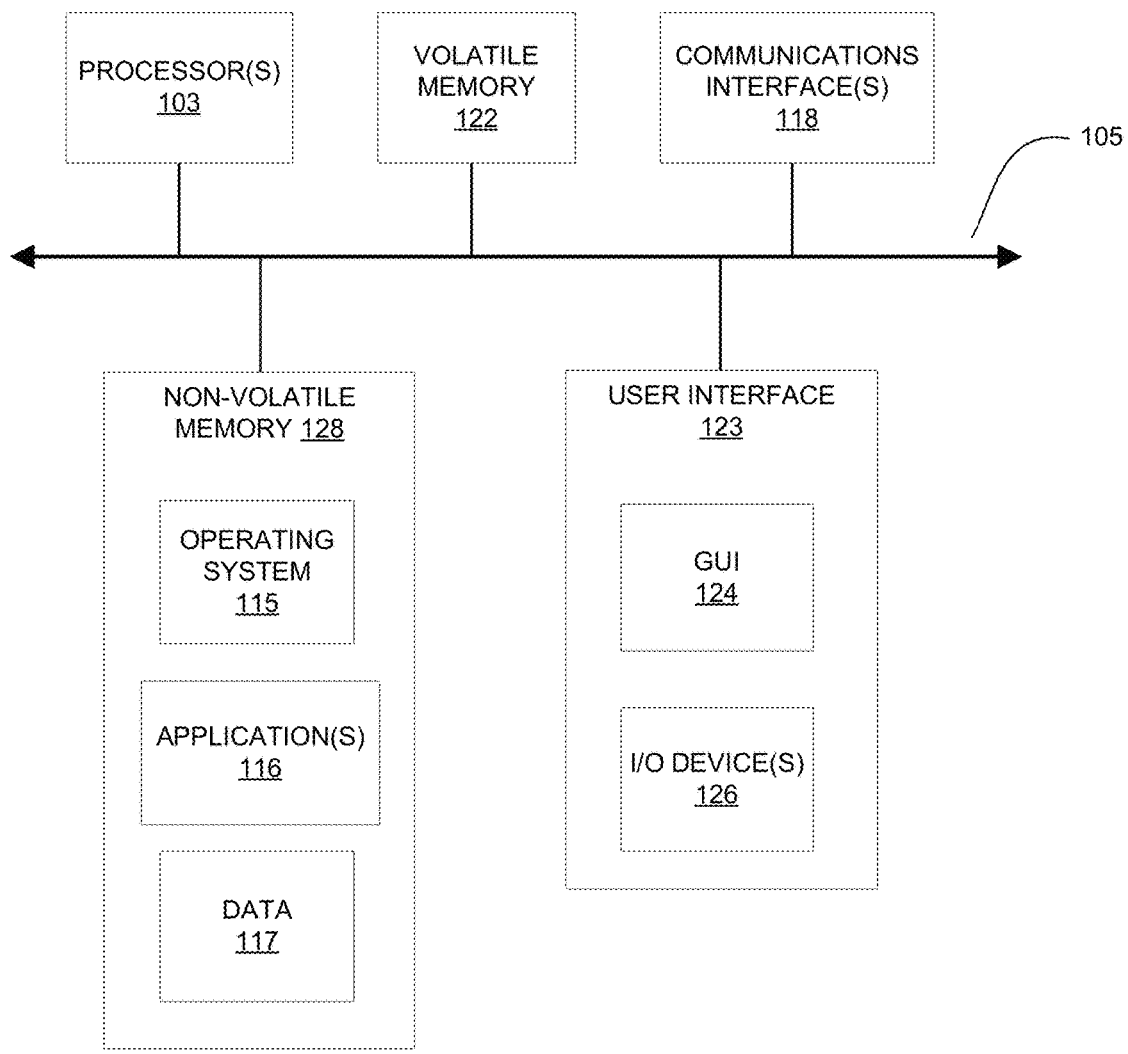
FIG. 1B is a block diagram of an example computing device, in accordance with an illustrative embodiment.

In some embodiments, the client device 120 includes one or more hardware elements for facilitating data input and data presentation. In some embodiments, the client device 120 is implemented using special purpose logic circuitry, e.g., an application specific integrated circuit ("ASIC"). In some embodiments, the client device 120 is implemented using a system on a chip ("SoC") semiconductor device that includes at least one processor (or microprocessor) core. In some embodiments, the client device 120 is implemented using a general purpose computing processor. FIG. 1B, described in more detail below, illustrates a computing device 101 that, in some configurations, is suitable for use as a client device 120.

The networks 104$_a$, 104$_b$, and 104$_c$ (referred to generally as a network 104) link devices for communication. In some embodiments, data flows through the network 104 as a flow of data packets in accordance with the OSI layers, e.g., as a TCP or ICA flow. An illustrative network 104 is the Internet; however, other networks may be used. Each network 104$_a$, 104$_b$, and 104$_c$ may be an autonomous system ("AS"), i.e., a network that is operated under a consistent unified routing policy (or at least appears to from outside the AS network) and is generally managed by a single administrative entity (e.g., a system operator, administrator, or administrative group). A network 104 may be composed of multiple connected sub-networks or AS networks. Networks may include one or more network devices 144 propagating data through the network. Networks meet at boundary nodes, e.g., gateway nodes, routers, or multi-homed computing devices. A network 104 may include wired links, optical links, and/or radio links. A network 104 may include a telephony network, including, for example, a wireless telephony network implementing a wireless communication protocol such as the Global System for Mobile Communications ("GSM"), Code Division Multiple Access ("CDMA"), Time Division Synchronous Code Division Multiple Access ("TD-SCDMA"), Long-Term Evolution ("LTE"), or any other such protocol. A wireless network (such as a Wi-Fi network or a wireless telephony network) may use one or more radio receivers 134 for access to the network. The network 104 may be public, private, or a combination of public and private networks. Each of the networks 104$_a$, 104$_b$, and 104$_c$ may be any type and/or form of data network and/or communication network.

The network devices 144 are network nodes that forward network data (e.g., data packets) between other network nodes. Suitable examples of network devices 144 include switches, routers, hubs, multi-homed computing devices, or any other device used for network communications. A network device 144 may include two or more network interfaces (or physical "ports," which should not be confused with transport protocol ports) and logic circuitry for identifying, for particular data, an egress interface connected to another device that will move the particular data towards a destination. In some embodiments, the network devices 144 direct traffic based on routing configuration data to forward data towards traffic destinations. In some embodiments, the network devices 144 forward data according to routing tables. In some embodiments, the network devices 144 forward data according to a configuration, e.g., a configuration set by a software defined network ("SDN") controller. In some embodiments, a network device 144 includes a content-addressable memory ("CAM") or ternary content-addressable memory ("TCAM"), used in identifying egress interfaces for routing data. In some embodiments, a network device 144 implements additional network functionality, or directs traffic through additional network nodes providing network functionality. For example, a network device 144 may pass traffic through a firewall, a network address translator ("NAT"), a network filter, or some other node providing network functionality.

One or more servers 150 may be logically grouped (e.g., as a server farm), and may either be geographically co-located (e.g., on premises) or geographically dispersed (e.g., cloud based) from client devices 120 and/or other servers 150. In some embodiments, a server 150 or group of servers 150 executes one or more applications on behalf of one or more of client devices 120 (e.g., as an application server). In some embodiments, the servers 150 provide functionality such as, but not limited to, file server, gateway server, proxy server, or other similar server functions. In some embodiments, client devices 120 may seek access to hosted applications on servers 150. In some embodiments, a network device 144 or a server 150 may provide load balancing across multiple servers 150 to process requests from client devices 120, act as a proxy or access server to provide access to the one or more servers 150, provide security and/or act as a firewall between a client 120 and a server 150, provide Domain Name Service ("DNS") resolution, provide one or more virtual servers or virtual internet protocol servers, and/or provide a secure virtual private network ("VPN") connection from a client 120 to a server 150, such as a secure socket layer ("SSL") VPN connection and/or provide encryption and decryption operations. One particular network function is authentication, which is provided by an authentication server 160. In some embodiments, the authentication server 160 is a stand-alone device. In some embodiments, the functions and features of the authentication server 160 are incorporated into other servers 150.

In described embodiments, client devices 120, network devices 144, servers 150 (including the authentication server 160), and other devices shown in FIG. 1A may be deployed as (or executed on) any type and form of computing device, such as any desktop computer, laptop computer, or mobile device capable of communication over at least one network 104 and performing the operations described herein. For example, the client devices 120, servers 150, and other devices may each correspond to one computer, a plurality of computers, or a network of distributed computers such as the computing device 101 shown in FIG. 1B.

As shown in FIG. 1B, a computing device 101 may include one or more processors 103, volatile memory 122 (e.g., RAM), non-volatile memory 128, user interface (UI) 123, one or more communications interfaces 118 (e.g., a network interface card ("NIC") and/or a radio transmitter, e.g., for Wi-Fi or NFC communications), and a communication bus 105. The user interface 123 may include hardware for a graphical user interface ("GUI") 124 (e.g., a touchscreen, a display, etc.), one or more input/output ("I/O") devices 126 (e.g., a mouse, a keyboard, a speaker, etc.). Non-volatile memory 128 stores an operating system 115, one or more applications 116, and data 117 such that, for example, computer instructions of operating system 115 and/or applications 116 are executed by processor(s) 103 out of volatile memory 122. Data 117 may be entered using an input device of GUI 124 or received from I/O device(s) 126. Various elements of the computing device 101 may communicate via communication bus 105. The computing device 101 as shown in FIG. 1B is shown merely as an example, as client devices 120, servers 150 (including the authentication server 160), and other network devices 144 may be implemented by any computing or processing environment and with any type of machine or set of machines that may have suitable hardware and/or software capable of operating as described herein.

The processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more of an application specific integrated circuit ("ASIC"), microprocessor, digital signal processor, microcontroller, field programmable gate array ("FPGA"), programmable logic arrays ("PLA"), multi-core processor, or general-purpose computer processor with associated memory. The "processor" may be analog, digital, or mixed-signal. In some embodiments, the "processor" may be one or more physical processors or one or more "virtual" (e.g., remotely located or cloud-based) processors.

The non-volatile memory 128 may include one or more of a hard disk drive ("HDD"), solid state drive ("SSD") such as a Flash drive or other solid state storage media, or other magnetic, optical, circuit, or hybrid-type storage media. In some embodiments, the non-volatile memory 128 includes read-only memory ("ROM"). In some embodiments, storage may be virtualized, e.g., using one or more virtual storage volumes, such as a cloud storage, or a combination of such physical storage volumes and virtual storage volumes.

The communications interface 118 may include one or more interfaces to enable the computing device 101 to access a computer network 104 such as a LAN, a WAN, or the Internet through a variety of wired and/or wireless or cellular connections. In some embodiments, the communications interface 118 includes one or more network connection points (ports) and an interface controller. Network connection points may be wired connection points (e.g., Ethernet ports) or wireless (e.g., radio circuitry for Wi-Fi or mobile network communications).

Figure 1C:
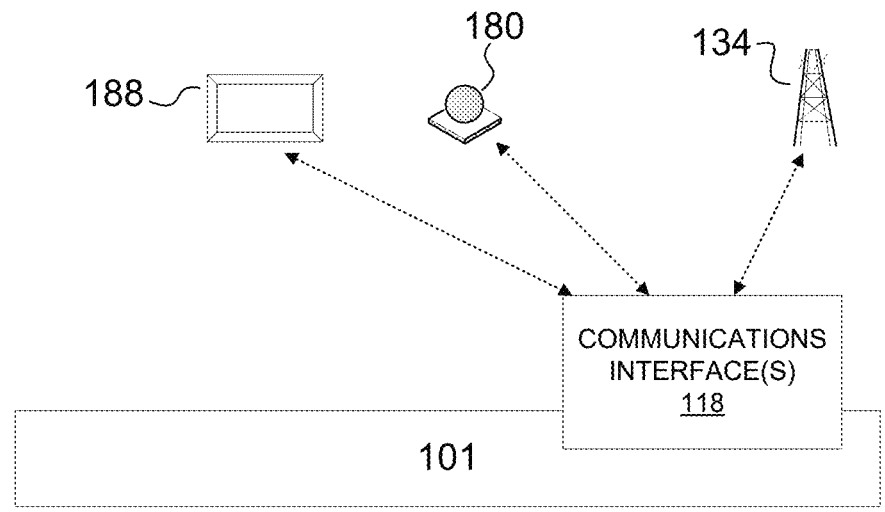
FIG. 1C is a block diagram of an example computing device in communication with mid-range or short-range radio-based devices, in accordance with an illustrative embodiment.

FIG. 1C is a block diagram of an example computing device 101 in communication with mid-range or short-range radio-based devices, in accordance with an illustrative embodiment. The communications interface 118 may include a short-range radio transmitter and receiver, e.g., for communication with an RFID reader or NFC tag 188 or a BLUETOOTH beacon 180. Some BLUETOOTH beacons 180 use the BLUETOOTH LOW ENERGY ("BLE") protocol. In some embodiments, the computing device 101 may use the short proximity requirements of these technologies to determine that the computing device 101 is in relatively close proximity to particular devices (e.g., an RFID or NFC tag 188 or a BLUETOOTH beacon 180). In some embodiments, the computing device 101 may use a network antennae 134 to determine that the computing device 101 is in relatively close proximity to a location corresponding to the network antennae 134. For example, the network antennae 134 may be an access point or base station for a mobile telephony system (e.g., for a particular cellular telephone communication network).

Figure 1D:
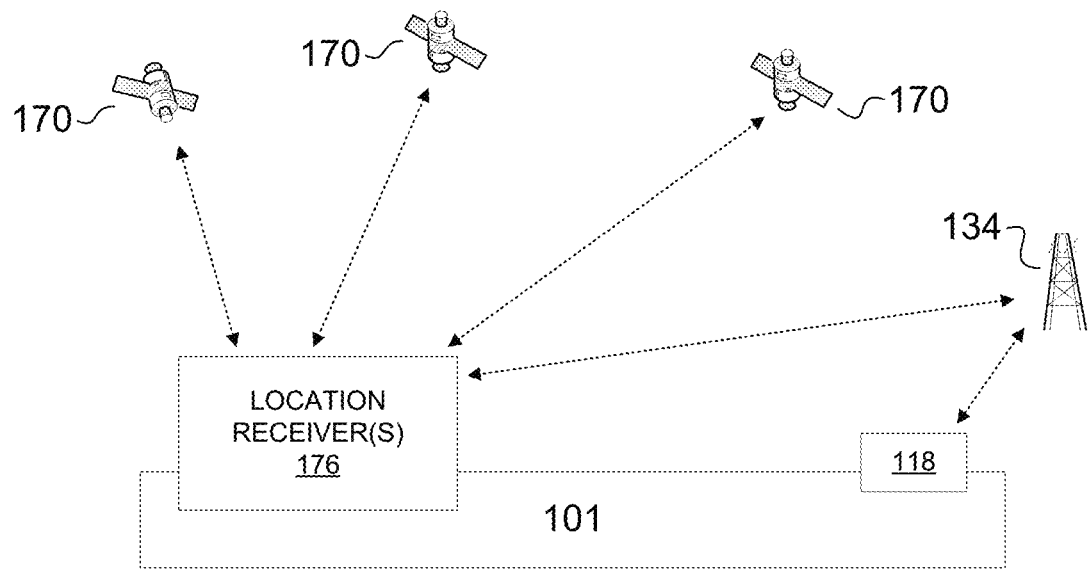
FIG. 1D is a block diagram of an example computing device receiving location signals from satellites and/or ascertaining location from mid-range radio-based devices, in accordance with an illustrative embodiment.

FIG. 1D is a block diagram of an example computing device 101 receiving location signals from satellites 170 and/or ascertaining location from mid-range radio-based devices (represented by antennae 134), in accordance with an illustrative embodiment. In some embodiments, the client device 120 includes one or more location receiver(s) 176 for receiving location signals from satellites 170 or other long-range transmitters (e.g., the aforementioned GNSS such as GPS, GLONASS, or Galileo). A computing device 101 equipped with a location receiver 176 may detect signals from multiple satellites 170 and use the signals to determine a location, e.g., a latitude and longitude coordinate pair, for the computing device 101. Typically, GNSS requires line of sight to the satellites 170 and works best outside. These systems may be less reliable, or unreliable, in locations where visibility to the satellites 170 is obstructed, e.g., inside. In some embodiments, the computing device 101 may use a network antennae 134 to determine that the computing device 101 is in relatively close proximity to a location corresponding to the network antennae 134. For example, the network antennae 134 may be an access point or base station for a Wi-Fi system within a building or complex.

As described in more detail below, a client device 120 may submit a request to a server 150 that requires authentication. An authentication server 160 (which may be the same server 150 or another designated authentication server 160) authenticates the provenance of the request prior to determining whether the server 150 should authorize or satisfy the request. In some instances, a request may be part of a session made of a series of requests or interactions. An initial request of the session (either the first request, or an early request in the session) may be a request to authenticate a source of the requests. For example, a client device 120 may initiate a session with a handshake protocol followed by a log-in request. The log-in request may include credentials, e.g., an account username or account identifier and secret knowledge specific to the account such as a pin code, passphrase, or password. After authentication, the session may be referred to as an authenticated session. Requests received after authentication, from the same source, may be referred to as authenticated requests. A session may be conducted, for example, in a secure communication protocol such that all requests may be reliably accepted as originating from the same source.

In order to authenticate the authentication request, the authentication server 160 may require that the request originate from a particular location. For example, requests from an IoT device installed in a particular building should be expected to originate from the particular building. In some embodiments, the authentication server 160 uses enforces location requirements based on a policy. For example, the authentication server 160 may require location to be specified in terms of latitude and longitude (e.g., from a GNSS such as GPS). As another example, the authentication server 160 may infer the location based on a network address for the request (e.g., using an IP address to geolocation database). In some examples, the authentication server 160 may be configured with location data for network access points 130 (e.g., Wi-Fi "hot spots" or radio antenna 134) and may require that the requesting device be communicating via a particular access point. In some embodiments, the authentication server 160 may have record of a location for a device such as a beacon 180 or short-range tag 188 and may require the device 120 submitting the authentication request to be within close proximity to the known-location device, where close proximity is sufficiently close enough to communicate with the known-location device using its particular short-range communication protocol. The policy may require location evidence using one or more forms of location evidence. The policy may require multiple forms of location evidence, e.g., IP address based geolocation and satellite-based latitude and longitude within a preset zone (or a distance from a fixed point). The following table (TABLE 1) lists some examples of location evidence that may be used:

TABLE 1

| Evidence Type | Description | Requirement |
| --- | --- | --- |
| Location based on GNSS such as GPS | When client has location described in latitude/longitude. Location is within certain geographic range. | Client should have a GPS receiver |
| Location based on IP Address | When client's location is estimated from IP address. Location is within certain geographic range. | Client should have an IP address which directly or routed to the internet |
| BLUETOOTH | When client detects BLUETOOTH or BLE beacon | Client should have a Bluetooth receiver |
| Wireless (Mobile Telephony or Wi-Fi) | When client connects to access point based on the name of access point | Client should access to wireless network |
| RFID | When client is in proximity to a device which can be detected by RFID | Client should have an RFID receiver |
| NFC | When client is in proximity to a device which can be detected by NFC | Client should have a NFC receiver |

Figure 2A:
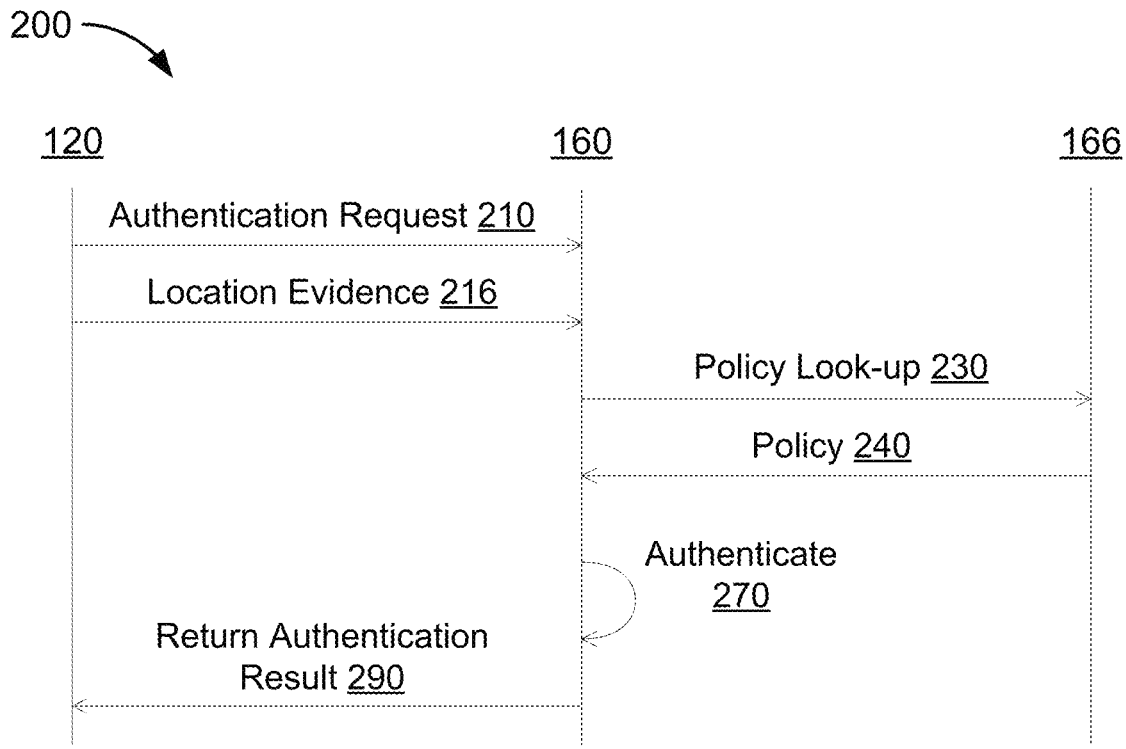
FIG. 2A and FIG. 2B are ladder diagrams for data exchanges used in authenticating a request.
Figure 2B:
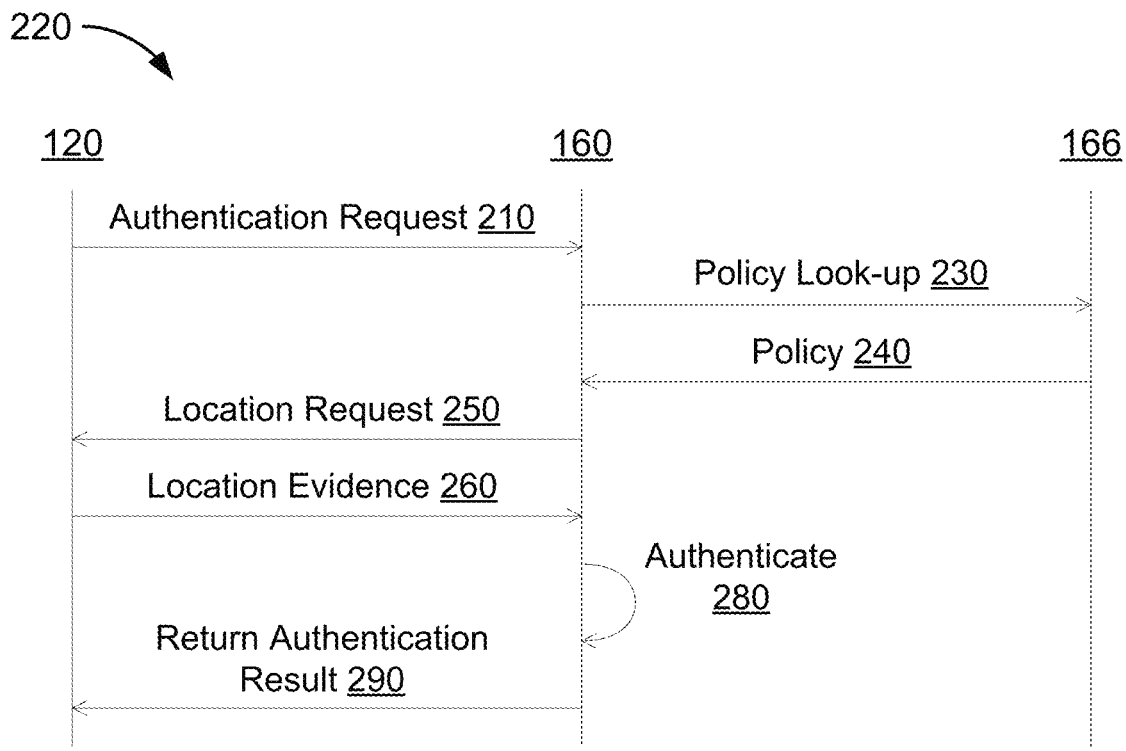

In some embodiments, the client device 120 is expected to know the location requirements without receiving a request. For example, an IoT device may be hardcoded to provide location data. In some embodiments, the client device 120 is provided with a specific location evidence request. For example, a more general-purpose device such as a smart phone may need to be informed of authentication policy requirements. FIG. 2A is a ladder diagram for a data exchange 200 used in authenticating a request without a location request. FIG. 2B is a ladder diagram for a similar data exchange 220 used in authenticating a request with a location request.

Figure 3A:
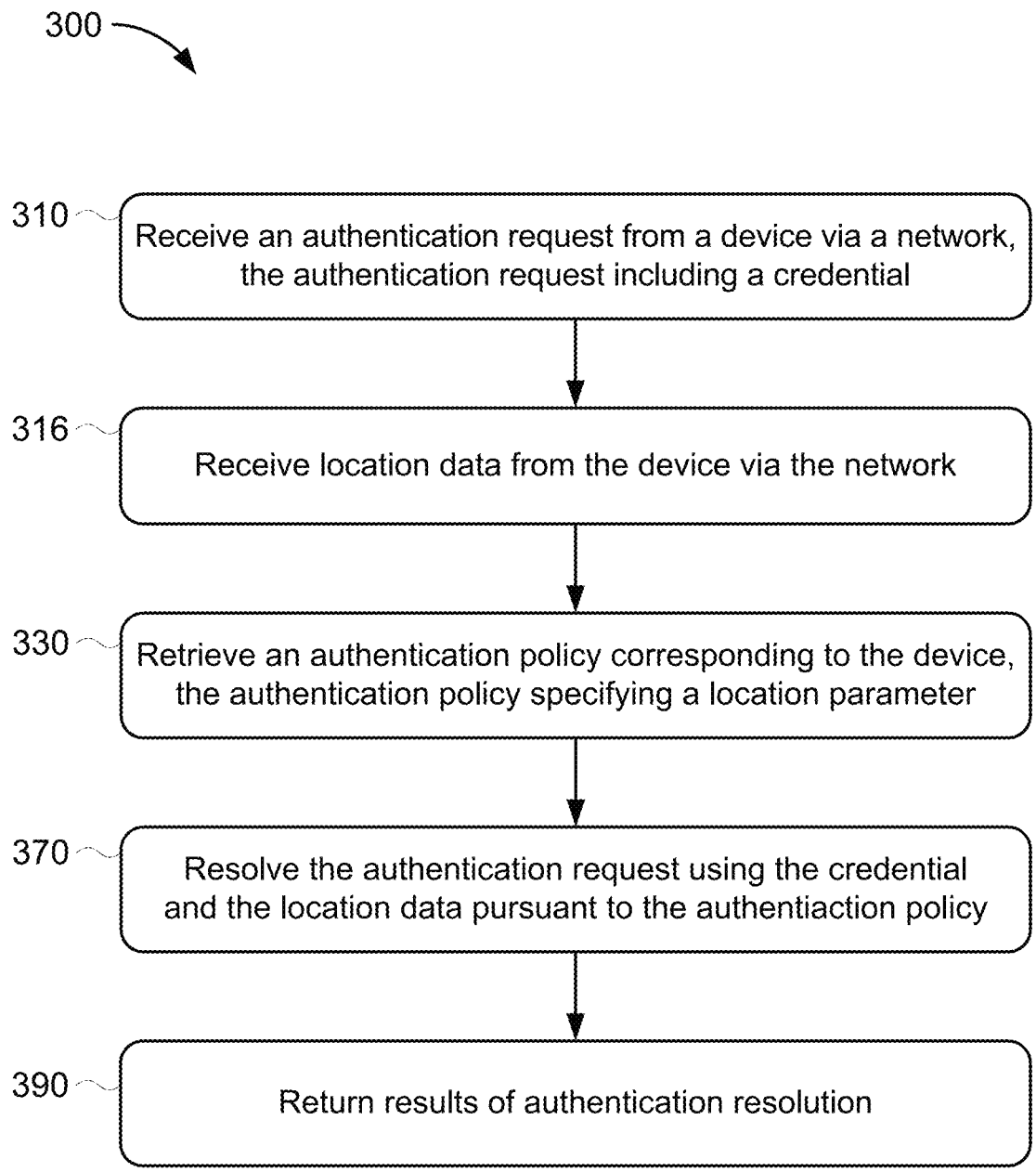
FIG. 3A is a flowchart for an example method of authenticating a request based on a location without requesting location data.

Referring first to FIG. 2A, the depicted ladder diagram illustrates a data exchange 200 in which a client device 120 submits an authentication request 210 to an authentication server 160 along with location evidence 216. In some embodiments, the authentication request 210 includes the location evidence 216. The authentication server 160 performs a policy look-up 230 from data storage 166 and retrieves policy data 240. The authentication server 160 then authenticates 270 the request and returns authentication result 290 to the client device 120. For example, the authentication server 160 may notify the client device 120 that the authentication request 210 has been accepted or rejected. FIG. 3A, described in more detail below, is a flowchart for an example method 300 of authenticating a request based on a location without requesting location data, e.g., as in the data exchange 200.

Figure 3B:
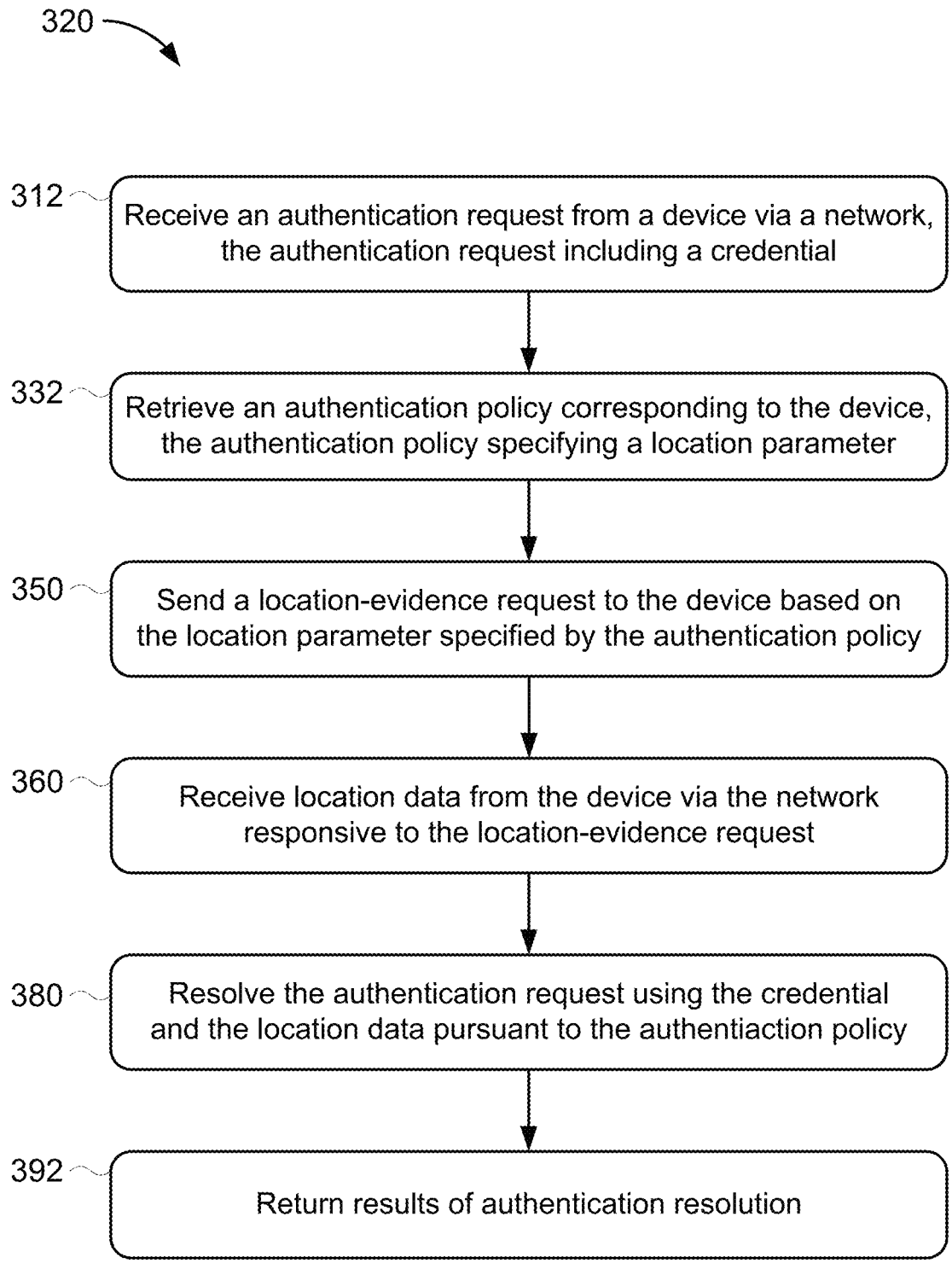
FIG. 3B is a flowchart for an example method of authenticating a request based on a location with at least one request for location data.

Referring to FIG. 2B, the depicted ladder diagram illustrates a data exchange 220 in which a client device 120 submits an authentication request 210 to an authentication server 160 without sufficient location evidence 216. In some embodiments, the authentication request 210 includes no location evidence at all, or includes insufficient evidence for a particular location authentication policy. The authentication server 160 performs a policy look-up 230 from data storage 166 and retrieves policy data 240. The authentication server 160 then sends a location request 250 to the client device 120, soliciting location evidence from the client device 120. The client device 120 return the requested location evidence 260 and the authentication server 160 then authenticates 280 the authentication request and returns authentication result 290 to the client device 120. For example, the authentication server 160 may notify the client device 120 that the authentication request 210 has been accepted or rejected. FIG. 3B, described in more detail below, is a flowchart for an example method 320 of authenticating a request based on a location with at least one request for location data, e.g., as in the data exchange 220.

FIG. 3A is a flowchart for an example method 300 of authenticating a request based on a location without requesting location data. As described above in reference to FIG. 2A, in some embodiments, the client device 120 is expected to know the location requirements without receiving a request. An authentication server 160 may receive an authentication request from such a device and process the request as shown in FIG. 3A. In brief overview, at stage 310, the authentication server 160 receives the authentication request from the device via a network, the authentication request including at least a credential. At stage 316, the authentication server 160 receives location data from the device via the network. The location data may be, for example, included in the authentication request received at stage 310. At stage 330, the authentication server 160 retrieves an authentication policy corresponding to the device, the authentication policy specifying a location parameter. The authentication server 160 may retrieve the authentication policy from a data storage system 166, as shown in FIG. 2A. The authentication server 160 may retrieve the authentication policy from a local cache. At stage 370, the authentication server 160 resolves the authentication request using the credential and the location data pursuant to the authentication policy. At stage 390, the authentication server 160 returns results of the authentication resolution, e.g., authenticating or rejecting the request received in stage 310.

Referring to FIG. 3A in more detail, in the example method 300, an authentication server 160 receives an authentication request from a device at stage 310. The device may be, for example, a client device 120 as depicted in FIG. 1A. The request from the device may be, for example, part of the exchange 200 depicted in FIG. 2A. The device may be participating in (or situated in) a first network (e.g., the provider network 104$_a$ depicted in FIG. 1A) and the authentication server 160 may be participating in (or situated in) a second network (e.g., the production network 104$_b$ depicted in FIG. 1A). The request may be a resource request (e.g., a request for a uniform resource locator ("URL")), may be a log-in request, may be a session initiation request, may be part of a custom protocol or standard protocol, may be part of a protocol handshake, may be an explicit request for authentication, may be an implicit request for authentication (e.g., a request that, in order to be processed, must first be authenticated), or any other type of request that may be used to trigger an authentication check. For example, in some embodiments, the request is a Hypertext Transfer Protocol ("HTTP") or HTTPS request, e.g., a GET or a POST request. In some embodiments, the request is received directly by the authentication server 160. In some embodiments, the request is first received by another server 150 (e.g., a web server) that outsources authentication to the authentication server 160.

The request may include origination information such as a device identifier (e.g., a media access control ("MAC") identifier), a network address (e.g., an IPv4 or IPv6 address), a software name, a software version (e.g., a browser version), and so forth. The request may include information identifying the type of device. For example, the request may explicitly state that the origination device is a particular make and model. In some embodiments, the authentication server 160 may determine the type of the device from the request, e.g., based on the MAC identifier, the software version, or other characteristics of the request.

The request includes a credential for authentication. In some embodiments, the credential includes an account identifier such as an account username. In some embodiments, the credential includes secret knowledge such as a pin code, a passphrase, or a password. For example, the credential may include an account username or account identifier and secret knowledge specific to the account such as a pin code, passphrase, or password. In some embodiments, the credential is an encrypted token or challenge response. For example, the credential may be a value provided by the server that has been encrypted by the device using either a secret key shared by both the server and the device or using an asymmetrical key. In some embodiments, the initial authentication request includes the credential. In some embodiments, the initial authentication request does not include the credential, and the device provides the credential in a subsequent message, e.g., as part of a sequence or in response to a server challenge. In some embodiments, the initial authentication request includes location data. In some embodiments, the initial authentication request does not include the location data, and the device provides the location data in a subsequent message, e.g., as part of a sequence or in response to a server challenge.

At stage 316, the authentication server 160 receives location data from the device via the network. The location data may be, for example, included in the authentication request received at stage 310. In some embodiments, the initial authentication request includes location data. In some embodiments, the initial authentication request does not include the location data, and the device provides the location data in a subsequent message, e.g., as part of a sequence or in response to a server challenge. The location data may include, for example, a latitude and longitude pair (e.g., as obtained by the device from a GNSS receiver such as a GPS receiver). The location data may include measurements from sensors built into the device, e.g., barometric readings. The location data may include network identifiers such as the network address assigned to the device and/or identifiers for the provider network 104$_a$. The location data may include timestamp information. In some embodiments, the location data is extracted by the server from the authentication request, e.g., parsing network address information from the request. In some embodiments, the location of an access point or radio antenna for the provider network 104$_a$ is known to the authentication server 160 and the ability of the device to communicate via the provider network 104$_a$ is evidence of its location. In some embodiments, the device is in proximity to a second device such as a short-range radio beacon 180. Examples of a suitable beacon 180 include, but are not limited to, an NFC tag or RFID tag, an RFID reader, the APPLE IBEACON, GOOGLE EDDYSTONE, QUALCOMM GIMBAL, PHILLIPS VISUAL LIGHT COMMUNICATIONS ("VLC"). In some such embodiments, the location of the short-range radio beacon 180 is known to the authentication server 160 and the ability of the device to communicate with the beacon 180 is evidence of its proximity thereto.

At stage 330, the authentication server 160 retrieves an authentication policy corresponding to the device, the authentication policy specifying a location parameter. The authentication server 160 may retrieve the authentication policy from a data storage system 166, as shown in FIG. 2A. The authentication server 160 may retrieve the authentication policy from a local cache. In some embodiments, the authentication server 160 retrieves the authentication policy from a data storage system 166 and keeps a cache or recently retrieved policies. In some embodiments, the authentication policy is specific to the device (or type of device) tendering the request. The authentication server 160 may perform a database query seeking an authentication policy for authenticating requests from devices of the device type. For example, the policy for authenticating requests originating from a multi-purpose device such as a personal computer, tablet, or smartphone may be different from the policy for authenticating requests originating from a single (or limited) purpose device such as an IoT sensor or monitor. In some embodiments, the policy may include variables dependent on an account identified in the credentials. For example, the policy may specify how the device should proof its location, and also specify acceptable locations for authentication of a particular account identifier.

In some embodiments, a policy may be tailored to the capabilities of the origination device. For example, the policy may require a satellite-based location (e.g., a latitude/longitude pair) from a device equipped with a GNSS receiver (such as a GPS receiver), but not require a satellite-based location from a device not equipped with a GNSS receiver. In some embodiments, the policy may have alternative requirements, or fallback requirements. For example, a device equipped with a GNSS receiver might not be able to receive adequate satellite signals when used inside, and the policy may account for this by requiring that the device be participating in a particular local-area network ("LAN") when GNSS signals are unavailable. Likewise, the policy may require that a device with an RFID reader report a value from a near-by RFID tag, or that a device with an NFC reader report a value from a near-by NFC tag. For example, a tag may have a unique value or ID and the device may be required to report the ID to the authentication server 160.

In some embodiments, an authentication policy may include frequency or recency requirements. For example, the authentication policy may mandate that a device equipped with a GNSS receiver may only use the fallback "inside" evidence if the same device has recently provided latitude/longitude in a previous authentication attempt (e.g., within the preceding hour, within the preceding day or twenty-four hours, within the preceding week, month, year, etc.).

In some embodiments, an authentication policy may require multiple forms of location evidence. For example, a policy may require that the device provide both a satellite-based location and be connected to a network via an access point associated with the location. As another example, the policy may require that the device provide a satellite-based location within a certain range, and provide an ID from a near-by short-range radio device (e.g., an NFC tag or RFID tag or BLUETOOTH beacon) and that the device has network access via a particular wireless access point named in the policy.

In some embodiments, the location data is encrypted. For example, in some embodiments, the client device 120 obtains an encrypted token from a second device (e.g., a short-range radio beacon 180) and provides the authentication server 160 with the encrypted token as evidence of its proximity to the second device. In some embodiments, the second device is equipped with a network connection and receives the token from the authentication server 160, e.g., as a one-time use challenge.

At stage 370, the authentication server 160 resolves the authentication request using the credential and the location data pursuant to the authentication policy. In some embodiments, the authentication server 160 deems the request authentic if the credential is authentic and the location data evidences that the device is in a particular location as required by the authentication policy. In some embodiments, the device must be within a geographic zone specified by the policy. For example, the policy may specify a zone by boundaries, by distance from a center point, or by other means. In some embodiments, the device must be within a threshold distance of a specified location. In some embodiments, the device must be on a particular network, or accessing a particular network via a particular access point or antenna. In some embodiments, the device must be in proximity to another device. In some embodiments, the authentication policy may mandate that the device satisfy multiple conditions, e.g., participating in a particular network and being in proximity to another device. In some embodiments, additional authentication factors may be used. In some embodiments, an authentic credential may be rejected if the device doesn't satisfy the location policy. In some embodiments, the authentication server 160 need not consider the credential unless the device satisfies the location policy.

At stage 390, the authentication server 160 returns results of the authentication resolution, e.g., authenticating or rejecting the request received in stage 310. In some embodiments, the authentication server 160 only responds to the requesting device if the request is successfully authenticated. In some embodiments, the authentication server 160 notifies the requesting device that the authentication request was rejected. In some embodiments, if the authentication request was rejected, the authentication server 160 solicits additional information from the device, e.g., requesting specific location data or a revised credential. In some embodiments, the authentication server 160 provides, to the device, a description of at least some portion of the authentication policy. For example, the authentication server 160 may request that the device provide one or more forms of location evidence from a list of acceptable forms of location evidence. If more information is requests, the method 300 may effectively resemble a method of authenticating a request based on a location with at least one request for location data, e.g., as described in reference to FIG. 3B.

FIG. 3B is a flowchart for an example method 320 of authenticating a request based on a location with at least one request for location data. As described above in reference to FIG. 2B, in some embodiments, the client device 120 submits an authentication request that includes no location evidence at all, or includes insufficient evidence for a particular location authentication policy. An authentication server 160 may receive an authentication request from such a device and process the request as shown in FIG. 3B. In brief overview, at stage 312, the authentication server 160 receives the authentication request from the device via a network, the authentication request including at least a credential. At stage 332, the authentication server 160 retrieves an authentication policy corresponding to the device, the authentication policy specifying a location parameter. At stage 350, the authentication server 160 sends a location-evidence request to the device based on the location parameter specified by the authentication policy. At stage 360, the authentication server 160 receives location data from the device via the network responsive to the location-evidence request. In some instances, the device may be unable to comply with the location-evidence request and stages 332, 350, and 360 may be iterated for one or more fallback policies; this situation is described in more detail in reference to FIG. 4. Still referring to the method 320 illustrated in FIG. 3B, at stage 380, the authentication server 160 resolves the authentication request using the credential and the location data pursuant to the authentication policy. At stage 392, the authentication server 160 returns results of the authentication resolution, e.g., authenticating or rejecting the request received in stage 312.

Referring to FIG. 3B in more detail, in the example method 320, an authentication server 160 receives an authentication request from a device at stage 312. The device may be, for example, a client device 120 as depicted in FIG. 1A. The request from the device may be, for example, part of the exchange 220 depicted in FIG. 2B. The device may be participating in (or situated in) a first network (e.g., the provider network $104_a$ depicted in FIG. 1A) and the authentication server 160 may be participating in (or situated in) a second network (e.g., the production network $104_b$ depicted in FIG. 1A). The types or forms of request received in stage 312 may be similar to, or equivalent to, the types or forms of request described above in reference to stage 310 from FIG. 3A. For example, the request received in stage 312 includes a credential. In some embodiments, the credential includes an account identifier such as an account username. In some embodiments, the credential includes secret knowledge such as a pin code, a passphrase, or a password. For example, the credential may include an account username or account identifier and secret knowledge specific to the account such as a pin code, passphrase, or password. In some embodiments, the credential is an encrypted token or challenge response. For example, the credential may be a value provided by the server that has been encrypted by the device using either a secret key shared by both the server and the device or using an asymmetrical key. In some embodiments, the initial authentication request includes the credential. In some embodiments, the initial authentication request does not include the credential, and the device provides the credential in a subsequent message, e.g., as part of a sequence or in response to a server challenge. In some embodiments, the request received in stage 312 explicitly or implicitly identifies the device, or type of device, submitting the request. For example, the request may include a device identifier or information corresponding to a device type.

At stage 332, the authentication server 160 retrieves an authentication policy corresponding to the device, the authentication policy specifying a location parameter. In some embodiments, the authentication policy is similar to, or equivalent to, one of the authentication policies described above in reference to stage 330 from FIG. 3A. In some embodiments, the authentication server 160 identifies a device type for the device submitting the request, from information included in the authentication request received in stage 312, and performs a database query (or cache lookup) to identify one or more authentication policies corresponding to the identified device type. As described above, some authentication policies may be tailored to the specific capabilities or functionalities of specific types of devices. In some embodiments, the authentication policy may indicate how much information can be sent to the device in a location-evidence request.

At stage 350, the authentication server 160 sends a location-evidence request to the device based on the location parameter specified by the authentication policy. The authentication server 160 generates and sends a request for proof of the device's location. For example, the authentication server 160 may determine from the authentication policy that the device has (or should have) a GNSS receiver and send the device a request for its current satellite-based location. In some instances, the request could be satisfied with a latitude longitude pair. In some embodiments, the request may indicate that the device should provide the latitude longitude location and additional data detailing how it was determined, e.g., providing a count of the number of GNSS satellites used, identifiers for the GNSS satellites used, timestamps in received satellite signals, etc.

At stage 360, the authentication server 160 receives location data from the device via the network responsive to the location-evidence request. That is, the device receives the location-evidence request transmitted in stage 350 and attempts to comply by providing location data received by the authentication server 160 at stage 360. In some embodiments, the authentication server 160 may receive the requested location evidence. In some embodiments, the authentication server 160 may receive less-than all of the requested data, and the authentication server 160 determines whether the tendered data is sufficient in accordance with the policy. For example, the authentication policy may allow for alternative forms of location evidence and the device might provide one or more of the alternatives. In some embodiments, if the authentication server 160 does not receive the expected location evidence, it identifies an acceptable alternative (e.g., with another look-up as described in reference to stage 332) and sends another location-evidence request (e.g., as described in reference to stage 350). In some embodiments, the device submits an explicit request for an alternative option and the authentication server 160, receiving the explicit request, responds with an alternative.

At stage 380, the authentication server 160 resolves the authentication request using the credential and the location data pursuant to the authentication policy. In some embodiments, the resolving the authentication request at stage 380 is similar to, or equivalent to, resolving the authentication request as described above in reference to stage 370 from FIG. 3A. In some embodiments, in stage 380, the authentication server 160 may determine that additional information is needed and may submit additional "challenge" requests to the device, e.g., by returning to stage 332 or stage 350.

At stage 392, the authentication server 160 returns results of the authentication resolution, e.g., authenticating or rejecting the request received in stage 312. In some embodiments, returning the results at stage 392 is similar to, or equivalent to, returning the results as described above in reference to stage 390 from FIG. 3A.

In some embodiments, the authentication server 160, having authenticated a request from a device, may then determine if the authenticated request is authorized. That is, authentication determines the authenticity of a request, e.g., verifying that the source of the request is authentic. However, the source of the request might lack authority to complete the request. For example, the request may require certain privileges or permissions that might (or might not) have been granted to the requestor.

Figure 4:
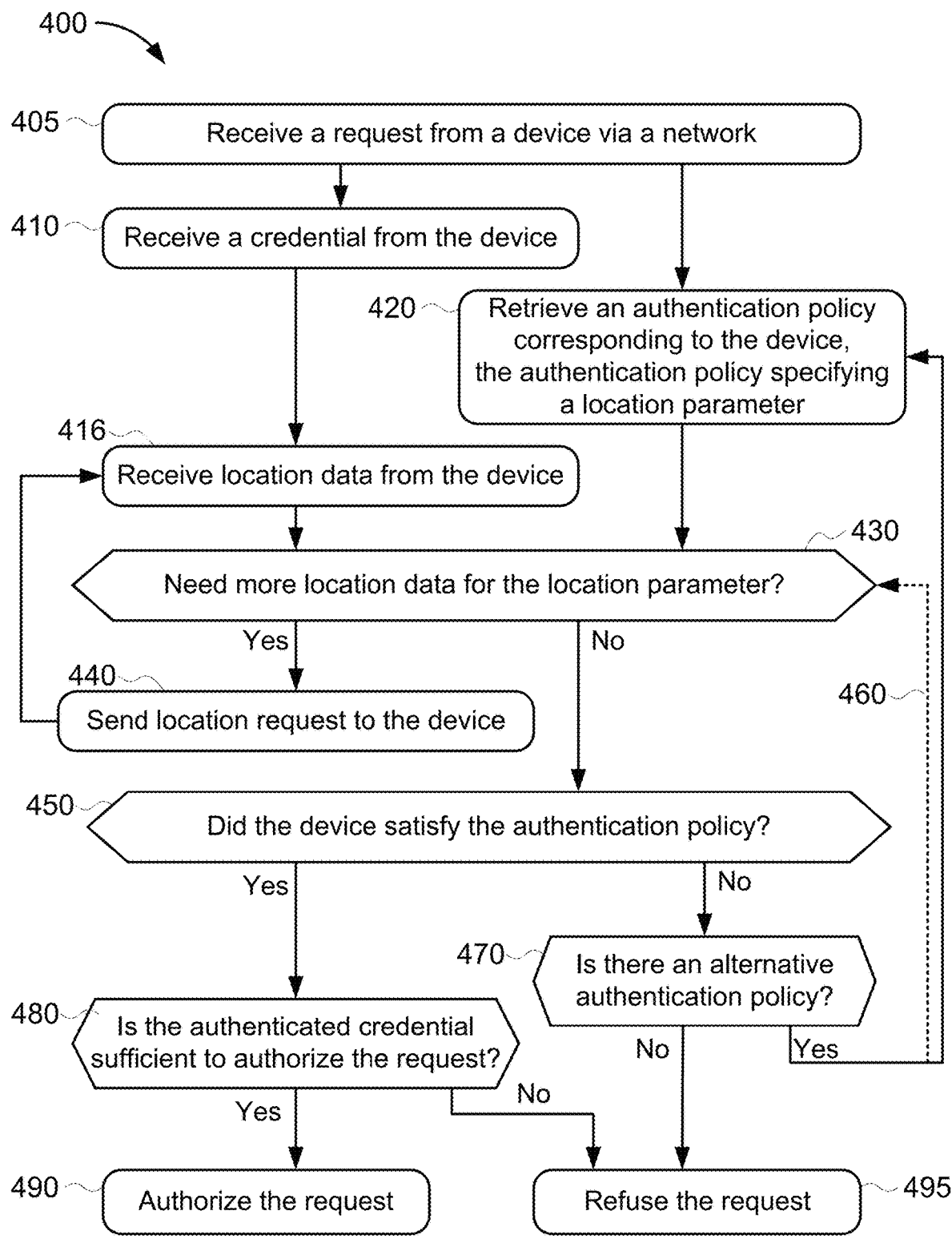
FIG. 4 is a flowchart for an example method of authenticating a request based on a location and determining whether an authenticated request is authorized.

FIG. 4 is a flowchart for an example method 400 of authenticating a request based on a location and determining whether an authenticated request is authorized. In brief overview, at stage 405, an authentication server 160 receives a request from a device via a network. At stage 410 the authentication server 160 receives a credential from the device and at stage 416 the authentication server 160 receives location data from the device. In some instances, the request received at stage 405 may include the credential and/or the location data. In some instances, the authentication server 160 may initially receive the credential but no location data. At stage 420, the authentication server 160 retrieves an authentication policy corresponding to the device, the authentication policy specifying a location parameter. At stage 430, the authentication server 160 determines whether the location data received from the device was sufficient, or if additional location data should be requested. If more data is needed, then at stage 440, the authentication server 160 sends a location request to the device and, at stage 416, receives location data from the device. If the authentication server 160 has received the necessary data, then at stage 450 the authentication server 160 determines whether the location data and the credential satisfy the authentication policy. In some embodiments, the authentication policy may allow for alternative location data. In such embodiments, if the authentication server 160 determines at stage 450 that the policy has not yet been satisfied, then at stage 470 the authentication server 160 determines whether there is an alternative authentication policy available and, if necessary, returns to stage 420 to retrieve the alternative authentication policy. (In some embodiments, the alternative may already be loaded and, as indicated by arrow 460, the authentication server 160 may simply return to stage 430 to determine if more location data is needed.) If the authentication server 160 determines at stage 350 that the request is authentic, then the authentication server 160 (or another server such as an authorization server) determines at stage 480 wither the authenticated credential is sufficient to authorize the request. If so, then at stage 490, the server authorizes the request. However, if the request fails at stage 450, or if there is no alternative policy at stage 470, or if the authenticated credential is not authorized for the request at stage 480, then at stage 495 the request is refused.

Referring to FIG. 4 in more detail, at stage 405, an authentication server 160 receives a request from a device via a network. The received request may be an explicit authentication request, e.g., a log-in request or session initiation request. The received request may be a request that needs to be authenticated, e.g., a data request. The received request may be a request to report data. The received request may be part of a transaction, a data exchange, or a session. In some embodiments, the received request conforms to a custom protocol. In some embodiments, the received request conforms to a standardized protocol. The request may include origination information such as a device identifier (e.g., a media access control ("MAC") identifier), a network address (e.g., an IPv4 or IPv6 address), a software name, a software version (e.g., a browser version), and so forth. The request may include information identifying the type of device originating the request. For example, the request may explicitly state that the origination device is a particular make and model. In some embodiments, the authentication server 160 may determine the type of the device from the request, e.g., based on the MAC identifier, the software version, or other characteristics of the request. In some embodiments, the request received in stage 405 includes a credential and/or location data. In some embodiments, the request includes a token. In some embodiments the request is similar to, or equivalent to, the requests described above in reference to stage 310 of the method 300 in FIG. 3A and/or in reference to stage 312 of the method 320 in FIG. 3B.

At stage 410 the authentication server 160 receives a credential from the device and at stage 416 the authentication server 160 receives location data from the device. In some instances, the request received at stage 405 may include the credential and/or the location data. In some instances, the authentication server 160 may initially receive the credential but no location data. Receiving credentials and location data is described above, in reference to FIG. 3A and FIG. 3B.

At stage 420, the authentication server 160 retrieves an authentication policy corresponding to the device, the authentication policy specifying a location parameter. In some embodiments, retrieving the authentication policy is similar to, or equivalent to, the retrievals described above in reference to stage 330 in FIG. 3A and stage 332 in FIG. 3B. In some embodiments, stage 420 may be repeated iteratively, e.g., progressively identifying fallback policies when a device is unable to comply with a policy. For example, in a first iteration, a device with a GNSS receiver may be required to provide satellite-based location data; however, the device might not be able to comply (e.g., because it is inside), and the authentication server 160 may look-up a fallback policy, e.g., a requirement that the device be participating on a network $104_a$ at an acceptable indoor location.

At stage 430, the authentication server 160 determines whether the location data received from the device was sufficient, or if additional location data should be requested. That is, the device may have submitted location data received at stage 416. For example, the device may have submitted network identifiers in an initial request. In this example, if the network identifiers are sufficient to satisfy the policy, then no further location data is needed. However, if the policy required, for example, satellite-based location data, then additional information might be needed from the device. If more data is needed, then at stage 440, the authentication server 160 sends a location request to the device and, at stage 416, receives location data from the device. This is described above in reference to stage 350 and stage 360 of the method 320 illustrated in FIG. 3B.

If the authentication server 160 determines at stage 430 that is has received the necessary location data, then at stage 450 the authentication server 160 determines whether the location data and the credential satisfy the authentication policy. In some embodiments, the authentication policy may allow for alternative location data. In such embodiments, if the authentication server 160 determines at stage 450 that the policy has not yet been satisfied, then at stage 470 the authentication server 160 determines whether there is an alternative authentication policy available and, if necessary, returns to stage 420 to retrieve the alternative authentication policy. (In some embodiments, the alternative may already be loaded and, as indicated by arrow 460, the authentication server 160 may simply return to stage 430 to determine if more location data is needed.)

If the authentication server 160 determines at stage 350 that the request is authentic, then the authentication server 160 (or another server such as an authorization server) determines at stage 480 whether the authenticated credential is sufficient to authorize the request.

If the authentication server 160 determines at stage 380 that the authenticated credential is sufficient to authorize the request, then at stage 490, the server authorizes the request. In some embodiments, the request is to initiate a session and, at stage 490, the authentication server 160 authorizes the session to proceed. In some embodiments, the request is to retrieve a resource and, at stage 490, the authentication server 160 authorizes a server (e.g., a server 150) to provide the resource responsive to the request. In some embodiments, the request is record data and, at stage 490, the authentication server 160 authorizes a server (e.g., a server 150) to accept and record the data.

If the request fails to be authenticated at stage 450, or if there is no alternative policy at stage 470, or if the authenticated credential is not authorized for the request at stage 480, then at stage 495 the request is refused. In some embodiments, the authentication server 160 refuses the request by sending an explicit rejection message to the requesting device. In some embodiments, the authentication server 160 refuses the request by dropping (or otherwise ignoring) the request from the device. In some embodiments, the authentication server 160 refuses the request by terminating a session with the requesting device. In some embodiments, the authentication server 160 caches identifiers for the requesting device and refuses to accept further messages or requests from the device.

Figure 5:
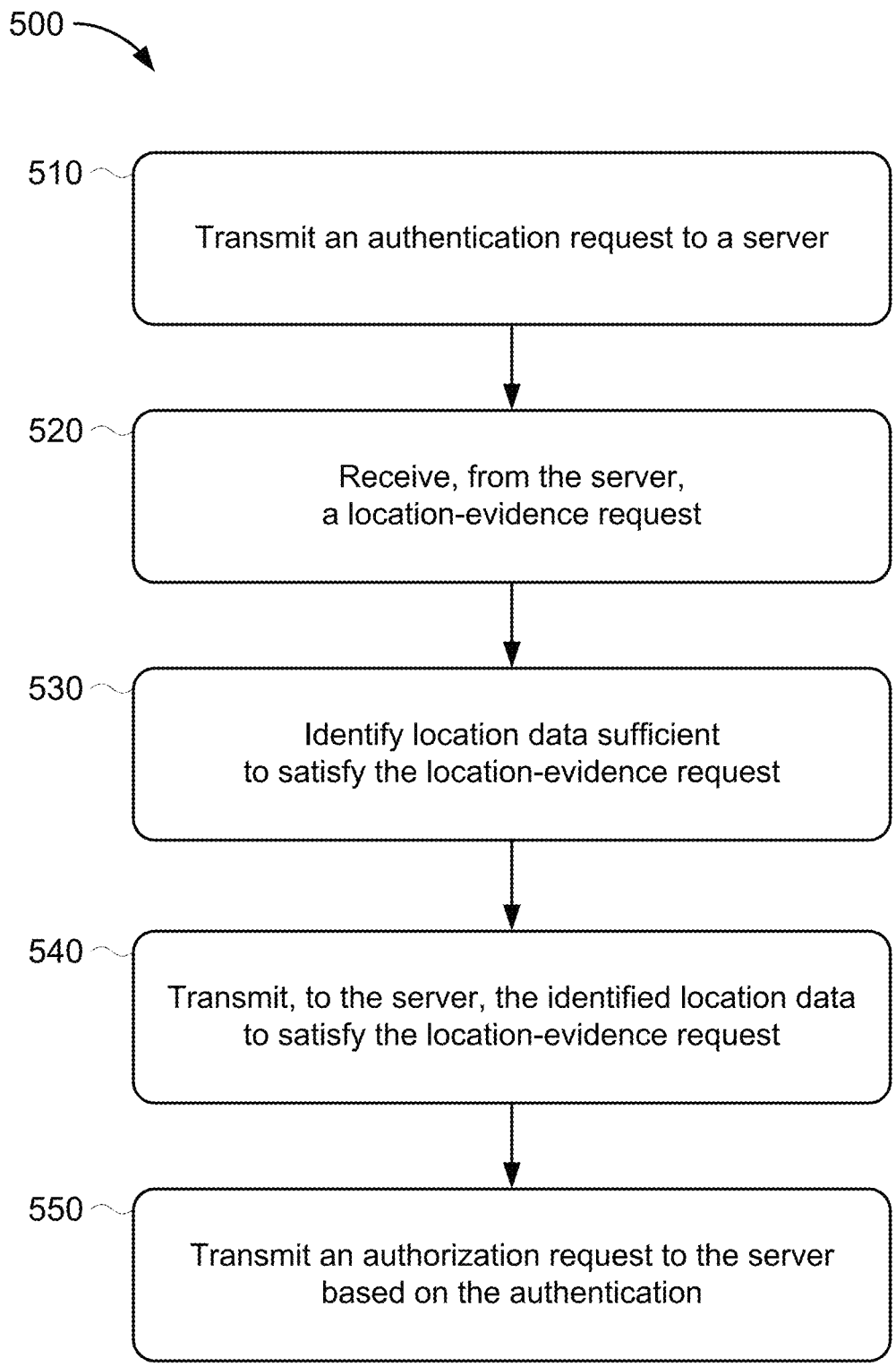
FIG. 5 is a flowchart for an example method of submitting a request for authentication.

FIG. 5 is a flowchart for an example method 500 of submitting a request for authentication. The example method 500 is from the perspective of a client device 120, e.g., engaging in the interaction illustrated in FIG. 2B. In broad overview of the method 500, at stage 510, the client device 120 transmits an authentication request to a server and receives, at stage 520, from the server, a location-evidence request. At stage 530, the client device 120 identifies location data sufficient to satisfy the location-evidence request and at stage 540 transmits, to the server, the identified location data to satisfy the location-evidence request. The client device 120, may then receive some indication of authentication. The authentication may be used by the client device 120 to submit authenticated requests. For example, at stage 550, the client device 120 transmits an authorization request to the server based on the authentication.

The systems and methods described may be used in a variety of embodiments. For example, and without limitation:

In at least one aspect, the above describes a method for authentication. The method includes receiving, by a server in a first network, an authentication request from a device in a second network, the authentication request including a first credential. The method includes retrieving, by the server, from a database storing authentication policies, an authentication policy corresponding to the device, the retrieved authentication policy specifying a location parameter. The method includes receiving, by the server, location data from the device. The method includes resolving the authentication request using the first credential and the received location data pursuant to the retrieved authentication policy.

In some embodiments of the method, the location parameter specifies that the device should provide a latitude and a longitude. In some embodiments of the method, the location parameter specifies a maximum distance from a latitude and a longitude. In some embodiments of the method, the location parameter specifies includes a network participation requirement, e.g., satisfied by the second network.

Some embodiments of the method include receiving, by the server from the device, a location of the device from a satellite-based positioning system, determining a distance from the location of the device to the specified latitude and longitude, comparing the determined distance to a range threshold, and resolving the authentication request based on the comparison of the distance to the range threshold. In some embodiments, the device must be within the threshold distance for the request to be authenticated.

Some embodiments of the method include receiving, by the server from the device, location proof data from a beacon proximate to the device, wherein the beacon is at a location known to the server. In some such embodiments, the location proof data is received by the device from the beacon via a short-range radio-frequency communication. In some embodiments, the location proof data is received by the device from the beacon via one of: BLUETOOTH, Near-Field Communication ("NFC"), or radio-frequency identification technology ("RFID"). In some embodiments, the method includes receiving, by the server from the device, location proof data that the device received from a second device proximate to the device, wherein the second device is in communication with the server and is separately authenticated by the server.

In some embodiments of the method, the location parameter includes a network participation requirement satisfied by the second network. Some such embodiments of the method include receiving, by the server from the device, proof that the device is participating in the second network.

Some embodiments of the method include receiving, by the server, the authentication request from the device via a cryptographically secured communication channel. Some embodiments of the method include transmitting, by the server to the device and responsive to receiving the authentication request, a secondary request soliciting the location parameter.

In at least one aspect, these methods may be encoded as computer-readable instructions for execution by one or more processors. The computer-readable instructions can be encoded on non-transitory computer-readable media.

In at least one aspect, the above describes a system for authentication. The system includes a database storing authentication policies. The system includes an authentication server in communication with the database, the authentication server situated in a first network. The authentication server includes at least one processor and is configured to receive an authentication request from a device in a second network, the authentication request including a first credential. The authentication server is configured to retrieve, from the database storing authentication policies, an authentication policy corresponding to the device, the retrieved authentication policy specifying a location parameter. The authentication server is configured to receive location data from the device and resolve the authentication request using the first credential and the received location data pursuant to the retrieved authentication policy.

In some embodiments of the system, the location parameter specifies that the device should provide a latitude and a longitude. In some embodiments of the system, the location parameter specifies a maximum distance from a latitude and a longitude. In some embodiments of the system, the location parameter specifies includes a network participation requirement, e.g., satisfied by the second network.

In some embodiments of the system, the authentication server is configured to receive, from the device, a location of the device from a satellite-based positioning system, determine a distance from the location of the device to the specified latitude and longitude, compare the determined distance to a range threshold, and resolve the authentication request based on the comparison of the distance to the range threshold. In some embodiments, the device must be within the threshold distance for the request to be authenticated.

In some embodiments of the system, the authentication server is configured to receive, from the device, location proof data from a beacon proximate to the device, wherein the beacon is at a location known to the server. In some such embodiments, the location proof data is received by the device from the beacon via a short-range radio-frequency communication. In some embodiments, the location proof data is received by the device from the beacon via one of: BLUETOOTH, Near-Field Communication ("NFC"), or radio-frequency identification technology ("RFID"). In some embodiments of the system, the authentication server is configured to receive, from the device, location proof data that the device received from a second device proximate to the device, wherein the second device is in communication with the server and is separately authenticated by the server.

In some embodiments of the system, the location parameter includes a network participation requirement satisfied by the second network. In some such embodiments of the system, the authentication server is configured to receive, from the device, proof that the device is participating in the second network.

In some embodiments of the system, the authentication server is configured to receive the authentication request from the device via a cryptographically secured communication channel. In some embodiments of the system, the authentication server is configured to transmit, to the device and responsive to receiving the authentication request, a secondary request soliciting the location parameter.

In some embodiments of the system, one or more processors in the authentication server are configured to execute instructions encoded on non-transitory computer-readable media.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:
1. A method of authentication, the method comprising:
  receiving, by a server in a first network, an authentication request from a device in a second network different from the first network, the authentication request including a first credential and a type of device;

identifying, by the server, using the authentication request, the type of device corresponding to the device from a plurality of types of devices;

determining, by the server from a plurality of types of locators, a type of locator supported by the device based at least on the type of device;

using, by the server, the type of locator determined to be supported by the device to select an authentication policy from a database maintaining a plurality of authentication policies corresponding to the plurality of types of locators, each authentication policy of the plurality of authentication policies specifying a respective type of locator to be used for a corresponding type of device and a location identifier defined by the respective type of locator from which the authentication request is to originate in order to authenticate the device to the first network from the second network;

transmitting, by the server to the device, a location-evidence request specifying the type of locator to be used in accordance with the authentication policy to authenticate the device, receipt of the location-evidence request causing the client to identify location data defined by the type of locator;

receiving, by the server, the location data defined by the type of locator from the device responsive to the location-evidence request; and resolving, by the server, the authentication request using the first credential and a comparison between the location data from the client and the location identifier specified by the authentication policy.

2. The method of claim 1, wherein the plurality of types of devices includes at least one of a sensor or a monitor and wherein the plurality of types of locators includes a satellite-based positioning system, a network access point, and a beacon.

3. The method of claim 1, comprising:
receiving, by the server from the device, a location of the device from a satellite-based positioning system;
determining a distance from the location of the device to the specified latitude and longitude;
comparing the determined distance to a range threshold; and
resolving the authentication request based on the comparison of the distance to the range threshold.

4. The method of claim 1, comprising receiving, by the server from the device, location proof data from a beacon proximate to the device, wherein the beacon is at a location known to the server.

5. The method of claim 4, wherein the location proof data is received by the device from the beacon via a short-range radio-frequency communication.

6. The method of claim 4, further comprising receiving, by the server from the device, location proof data from a second device proximate to the device, wherein the second device is in communication with the server and is separately authenticated by the server.

7. The method of claim 1, wherein the location parameter includes a network participation requirement satisfied by the second network.

8. The method of claim 7, comprising receiving, by the server from the device, proof that the device is participating in the second network.

9. The method of claim 1, comprising receiving, by the server, the authentication request from the device via a cryptographically secured communication channel.

10. The method of claim 1, comprising transmitting, by the server to the device and responsive to receiving the authentication request, a secondary request soliciting the location parameter.

11. A system for authentication, the system comprising:
an authentication server, having one or more hardware processors, the authentication server situated in a first network and configured to:
receive an authentication request from a device in a second network different from the first network, the authentication request including a first credential and a type of device;
identify, using the authentication request, the type of device corresponding to the device from a plurality of types of devices;
determine, from a plurality of types of locators, a type of locator supported by the device based at least on the type of device;
use the type of locator determined to be supported by the device to select an authentication policy from a database maintaining a plurality of authentication policies corresponding to the plurality of types of locators, each authentication policy of the plurality of authentication policies specifying a respective type of locator to be used for a corresponding type of device and a location identifier defined by the respective type of locator from which the authentication request is to originate in order to authenticate the device to the first network from the second network;
transmit, to the device, a location-evidence request specifying the type of locator to be used in accordance with the authentication policy to authenticate the device, receipt of the location-evidence request causing the client to identify location data defined by the type of locator;
receive the location data defined by the type of locator from the device responsive to the location-evidence request; and
resolve the authentication request using the first credential and a comparison between the location data from the client and the location identifier specified by the authentication policy.

12. The system of claim 11, wherein the plurality of types of devices includes at least one of a sensor or a monitor and wherein the plurality of types of locators includes a satellite-based positioning system, a network access point, or a beacon.

13. The system of claim 11, wherein the authentication server is further configured to:
receive, from the device, a location of the device from a satellite-based positioning system;
determine a distance from the location of the device to the specified latitude and longitude;
compare the determined distance to a range threshold; and
resolve the authentication request based on the comparison of the distance to the range threshold.

14. The system of claim 11, wherein the authentication server is further configured to receive, from the device, location proof data from a beacon proximate to the device, wherein the beacon is at a location known to the server.

15. The system of claim 14, wherein the location proof data is received by the device from the beacon via a short-range radio-frequency communication.

16. The system of claim 11, wherein the authentication server is further configured to receive, from the device, location proof data from a second device proximate to the device, wherein the second device is in communication with the server and is separately authenticated by the server.

17. The system of claim 11, wherein the location parameter includes a network participation requirement satisfied by the second network.

18. The system of claim 17, wherein the authentication server is further configured to receive, from the device, proof that the device is participating in the second network.

19. The system of claim 11, wherein the authentication server is further configured to receive the authentication request from the device via a cryptographically secured communication channel.

20. The system of claim 11, wherein the authentication server is further configured to transmit, to the device and responsive to receiving the authentication request, a secondary request soliciting the location parameter.

* * * * *